United States Patent [19]

Brodbeck

[11] 4,409,440
[45] Oct. 11, 1983

[54] TELEPHONE INDEX AND SWITCH ARRANGEMENT

[75] Inventor: Robert M. Brodbeck, Littleton, Colo.

[73] Assignee: Marcamor, Inc., Denver, Colo.

[21] Appl. No.: 324,788

[22] Filed: Nov. 25, 1981

[51] Int. Cl.³ .............................................. H04M 1/51
[52] U.S. Cl. .............................. 179/90 BD; 179/90 B; 340/825.03
[58] Field of Search ........... 179/90 BD, 90 BB, 90 B, 179/90 AD; 40/371, 372; 350/110; 340/825, 825.03

[56] References Cited

U.S. PATENT DOCUMENTS 4,164,630  8/1979  Brodbeck ........................ 179/90 B

FOREIGN PATENT DOCUMENTS 2813177  10/1978  Fed. Rep. of Germany .... 179/90 B
513524   5/1976   U.S.S.R. .............................. 179/90 B

OTHER PUBLICATIONS

A. F. Higginbotham, Electronic Abbreviated Directory, IBM Technical Disclosure Bulletin, vol. 22, No. 6, Nov. 1979, 2216-2217.

Primary Examiner—Stafford D. Schreyer
Attorney, Agent, or Firm—Ancel W. Lewis, Jr.

[57] ABSTRACT

A combined telephone index and switch arrangement for memory stored repertory for dialing data for automatic dial telephone systems, having a plurality of light sensitive diodes each keyed to a card in a card selector which selects a corresponding individual card of a multiple card index. A light source with a fiber optic secured to the selector transmits light from the light source to the card selector and to the diode for each card. Individual buttons corresponding to individual index lines of the displayed card can be manually activated to retrieve a telephone number stored in the memory for automatic dialing thereof.

10 Claims, 3 Drawing Figures

TELEPHONE INDEX AND SWITCH ARRANGEMENT

BACKGROUND OF THE INVENTION

I. Technical Field

The present invention relates to a combined telephone index and switch arrangement, and more particularly, to a combined telephone index and switch arrangement which utilizes a light sensitive diode to activate a memory area for retrieval of an individual number in that area.

II. Background Art

An automatic dial telephone system is rapidly becoming increasingly desirable to many telephone users, especially businesses. Several relatively recent prior art automatic dial systems have been proposed. U.S. Pat. No. 4,029,908 to Mosley et al, discloses a double scroll arrangement wherein one scroll contains visible names and telephone numbers, while the other scroll is a magnetic tape containing signals which correspond to the numbers on the visible scroll. The tapes of both scrolls must be synchronized and remain syncronized for operation. Both scrolls are conjunctively, and manually manipulated. U.S. Pat. No. 4,032,722 to Connelly et al discloses a circuitry and searching arrangement for an automatic dialing telephone which utilizes a switch unit 11 of manually operable way (or lead) switches 10. A number can be preset by the switches and a push button actuates a digital tone signal or impulse corresponding to the preset number. And Applicant's prior U.S. Pat. No. 4,164,360 discloses a combined telephone index and keyboard for an automatic dial telephone system utilizing a switch arrangement for initially latching onto a block of data of a micro processor, memory autodialer which corresponds to the data on a particular alphabetically arranged index card. The switch arrangement includes a slide card finder having a contact on its base which is adapted to slide over and engage the contact elements fixedly mounted in a base corresponding to a letter of the alphabet. However, utilizing electromechanical contact points in the switch arrangement will eventually lead to difficulties as worn contact points will provide inadequate contact to lock in the locking circuit.

Thus, a need exits for an improved switching arrangement for a telephone card index which can be utilized in conjunction with a keyboard for an automatic dial telephone system.

BRIEF SUMMARY OF THE INVENTION

The present invention relates to a combined multiple card telephone index and switch arrangement for memory stored dialing data for automatic dial telephone systems. The arrangement comprises a multiple card index, with each card providing a predetermined number of telephone numbers, and a card selector. A plurality of light sensitive diodes or switches are arranged so that each of the diodes or switches correspond to an individual card of the index. A stationary light source transmits light through a flexible fiber optic filament secured the selector to transmit light from the light source to the card selector and to the diodes. The card selector is positioned above the desired individual diode or switch and activation of the selector light impinges on the selected diode to produce an electrical impulse which is transmitted via appropriate circuitry to lock in dialing data in the memory which corresponds to the individual card. The desired card has associated manual activation buttons corresponding to a desired line of the exposed card, so that depressing the button retrieves the telephone number of that particular line from the memory for automatic dialing thereof.

BRIEF DESCRIPTION OF THE DRAWINGS

The invention will be more readily understood by reference to the accompanying drawings wherein like reference numerals indicate like elements throughout the drawing figures and in which.

DETAILED DESCRIPTION

Figure 1:
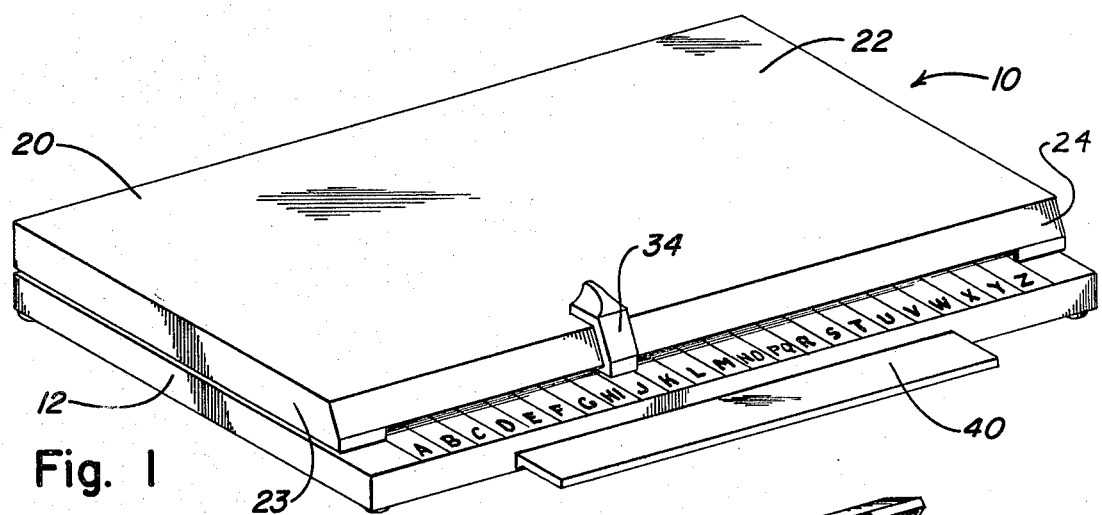
FIG. 1 is a perspective view of the combined telephone index and switch arrangement of the present invention in closed position.

As illustrated in the preferred embodiment of FIG. 1, the combined telephone index and switch arrangement of the present invention is illustrated as a flip-top repertory, generally as 10, and comprises a base housing 12, an index cover 20, and a release bar 40. As illustrated in greater detail in FIG. 2, cover 20 has a top surface 22, a bottom surface 26 spaced apart therefrom, sides 23, a back 25 and a front 24 which can be fixedly or releasably secured together by any conventional means, such as, by welds or screws, or can be integrally molded together. Although preferably configured as a paralellogram, cover 20 can possess a variety of configurations as will be evident to the skilled artisan. A light source 30, for example, a small voltage light bulb, is provided within cover 20 between top 22 and bottom 26 thereof. The light and its power source can be fixedly secured therein by any conventional means. The light source may, also, be positioned in any convenience place in or on the unit. Top 22 of cover 20 may have a red plastic bubble (not illustrated) secured within a bore through top 22 and directly above light source 30 so as to indicate the power status of light source 30. A flexible, fiber optic filament or bundle 32 has one end thereof secured to or positioned adjacent to light source 30 for accepting light from the light source, and transmitting it from this end to the other end thereof. The opposite end of fiber optic 32 is fixedly secured to slidably mounted card or selector 34, as hereinafter detailed. Thus, it will be appreciated that fiber optic 32 must possess sufficient length to allow selector 34 to slide from end to end of front 24. Housing 12 has a card index which consists of a plurality of flip cards 14 stacked one upon the other, each card having one edge thereof rotatably secured to the housing, such as, by rings 15. Each such card corresponds to at least one letter of the alphabet, and has notched index tabs so that when stacked one upon the other, the cards are normally progressively notched from one side to the other. A tab on selector 34 will lift all cards above the particular desired card leaving the desired card exposed when cover 20 is lifted from housing 12 as hereinafter described. Each card includes a plurality of left hand line areas and right hand line areas. The left and the right hand lines are equal in number, and each line may have an alphabetically arranged name, address and/or phone number printed thereon. Adjacent each line area is an actuating button 18. The plurality thereof forms a left hand column or button array, and a right hand column or button array adjacent to the appropriate edges of each card. A conventional release bar 40 is mounted to the front edge of housing 12 and functions upon being depressed to raise cover 20 thereby exposing the card indicated by selector 34.

Figure 2:
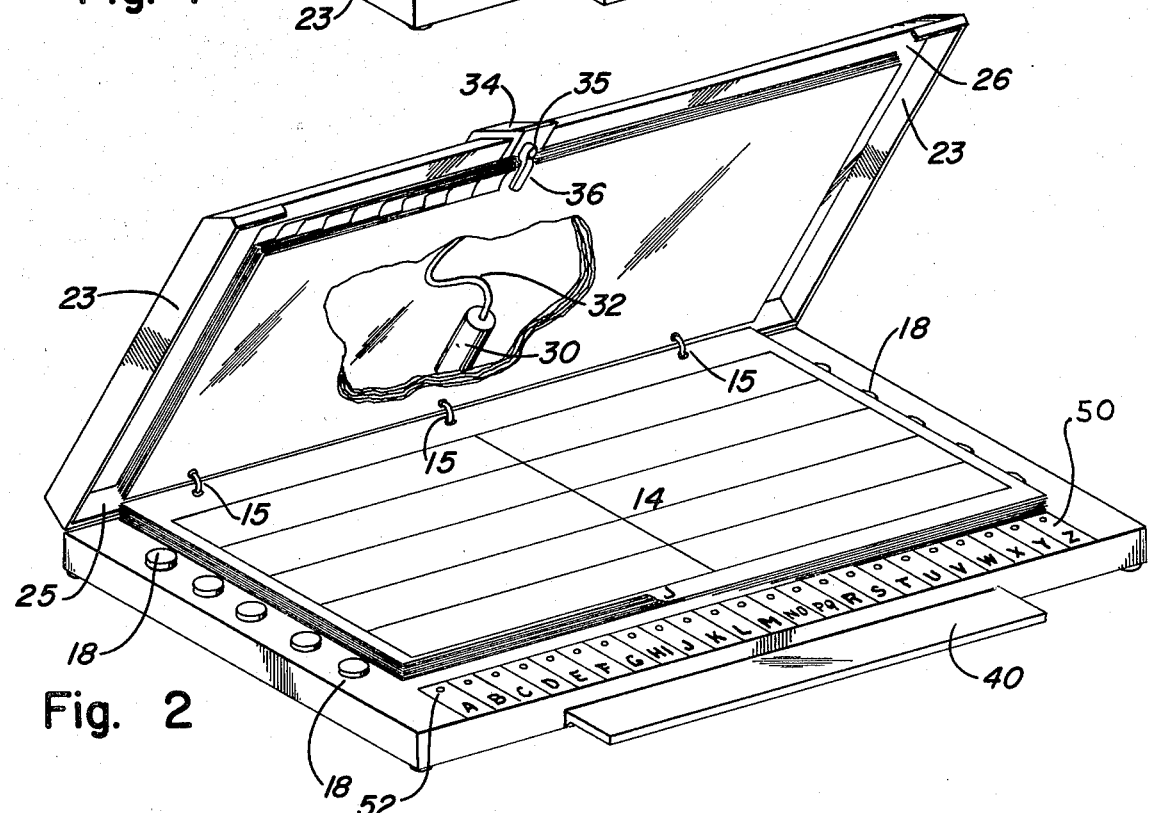
FIG. 2 is a perspective, partially cut away view of the index and switch arrangement of the present invention wherein the cover, thereof, is raised displaying a particular card of the index.
Figure 3:
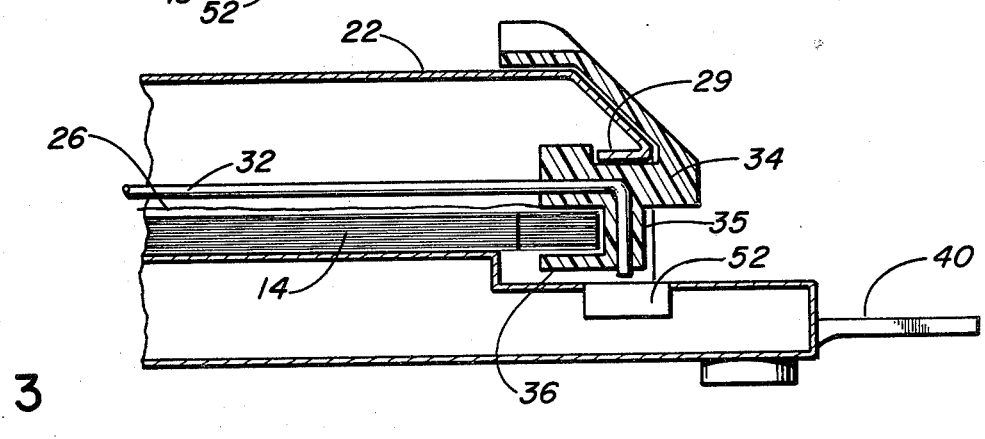
FIG. 3 is a cross sectional view of the combined telephone index and switch arrangement of the present invention taken along line 3—3 of FIG. 1.

As illustrated in FIG. 3, selector 34 has a generally C-shaped cross sectional configuration such that the bottom portion thereof rests on the inner surface of bottom 26 of cover 20. Front 24 of cover 20 terminates in an inwardly extending flange 29 substantially along the entire length thereof, and is slidably positioned in a slot on selector 34. As thus constructed, selector 34 may slide along substantially the entire length of the front 24 of cover 20 while being guided and supported by top 22, front edge 24, and flange 29 of cover 20. Selector 34 has a downwardly extending portion 35 and an inwardly extending U-shaped tab 36; the latter functioning to slide under the recessed portion of index cards 14. One selector 34 is positioned at the tab of the portion of the alphabet desired, release bar 40 is depressed to raise cover 20. Fiber optic bundle 32 is positioned by selector 34, and the downwardly extending portion 35 transmits light to the underlaying diode. Selector 34 can be constructed of plastic or tempered metal. As best illustrated in FIG. 2, an insert 50 is positioned within the front portion of the housing 12 so that the top of insert 50 is in substantially the same plane as the top of housing 12. Insert 50 contains a plurality of light sensitive diodes or switches 52 such as those manufactured by Dionics, Inc. of Westbury, N.Y. The light sensitive diodes or switches 52 function to convert input light into an output electrical impulse. Each photosensitive diode or switch 52 corresponds to that letter or letters of the alphabet imprinted on insert 50. Insert 50 can be integral along the entire length thereof, but preferably is formed in individual sections containing a diode or switch 52 therein so that in individual diode or switch 52 can be repaired or replaced without disturbing the other diodes or switches. Each diode has an individual lead (shown as lead 53) which extends to a microprocessor (not shown).

In operation, with cover 20 closed over the card index and light source 30 inactivated, card selector 34 is manually manipulated until selector 34 is juxaposed above the card tab of the portion of the alphabet desired. In this position when bar 40 is depressed, a switch (not shown) activates the light, and light is conducted from the light source 30 via fiber optic 32 and its extending portion 35 to the appropriate light sensitive diode 52. The light which impinges upon the diode or switch 52 is converted to an electrical impulse which is conducted via appropriate circuitry to the microprocessor locking in on the data block corresponding to the card index. The circuit is thus latched to the memory by known latch circuits, and it remains latched as long as the cover 20 is raised. A particular telephone number, which is shown on the exposed card, can be retrieved and transmitted to an automatic dialer system by pressing the activating button 18 corresponding to the particular line. This completes a finite circuit to retrieve the phone number from the data block. Once a phone number is dialed, cover 20 can be closed, and selector 34 manually manipulated to the appropriate portion of the alphabet, to lock in a new block of data corresponding to the desired index card. Release bar 40 is then depressed to expose the new index card for dialing purposes. The light source may be illuminated at all times, for example a light emitting diode has long life and uses a very small amount of energy to activate. The light source may be intermittant as where a conventional switch associated with the release bar actuates the light source, to flash illuminate the associate light accepting diode and open the first circuit to the particular data block. Also, a light emitting diode, secured to the selector, when controlled by a switch associated with the release bar is activated by a current to flash light to the light accepting diode and activate the first circuit.

The combined telephone index and switch arrangement of the present invention can be combined with an information processing and storage system including a keyboard and visual display assembly as disclosed in Applicant's U.S. Pat. No. 4,164,630. In this regard, Applicant's previous U.S. Pat. No. 4,164,630 issued Aug. 14, 1979 is incorporated herein by reference.

As thus described, the present invention provides combined telephone index and switch arrangement which obviates the need for electromechanical switches utilized in conjunction with a card selector and the problems associated therewith. The telephone index and switch arrangement of the present invention is relatively simple in construction employing a minimum of components parts, is relatively inexpensive, and can be easily repaired.

While various embodiments and modifications of this invention have been described in the foregoing description, further modification will be apparent to those skilled in the art. Such modifications are included within the scope of this invention as defined by the following claims.

I claim:

1. Telephone index and combined switch arrangement for memory stored dialing data for automatic dial telephone systems, said arrangement comprising:
   (a) multiple card index means for a visual listing of names and telephone numbers, each card including individual lines for individual numbers;
   (b) means to individually visual display a single card thereof;
   (c) a light source;
   (d) fiber optic means for conducting light enamating from said light source, to said means to individually display one of said cards;
   (e) light sensing means having a plurality of identical components, each of which is associated with a separate, individual card, and each of which functions to convert incident light to an electrical impulse, and activate a first circuit to a data block,
   (f) selector switch means for each said individual line of a displayed card for activating a second circuit associated with a particular line on a card to retrieve and automatically dial a telephone number stored at a location in the memory associated with said particular line.

2. Telephone index and combined switch arrangement for memory stored dialing data for automatic dial telephone systems, said arrangement comprising:
   (a) multiple card index means for a visual listing of names and telephone numbers, each card including individual lines for individual numbers, wherein each said card is divided into a plurality of left-hand lines and a plurality of right-hand lines;
   (b) cover means releasably and rotatably positioned over said cards so as to prevent visual display thereof in closed position, said cover having selector means for selecting an individual card of said multiple card index, said selection means being movably mounted on said cover;
(c) a light source;
(d) fiber optic means for conducting light emanating from said light source, said light conducting means being mounted for movement with said selector means;
(e) housing means for said multiple card index means and having light sensing means mounted thereon, said light sensing means including a plurality of identical components, each of which is associated with one separate individual card and each of which functions to convert incident light from said fiber optic means to an electrical impulse, said selector means being arranged to the juxtaposed over one of said components of said light sensing means when said cover is in closed position so that light transmitted from said light source via said fiber optic means impinges upon said one said components and completes a first circuit to said memory stored data for said individual card; and
(f) selector switch means including a left-hand and a right-hand series of activating buttons with one button in said left hand series for and adjacent to each of said left hand lines and one button of said right-hand series for and adjacent to each of said right hand lines so that said selector switch means is activated by one of said activating buttons to close a second circuit associated with a particular line on a card to retrieve and automatically dial a telephone number stored at a location in the memory associated with said particular line.

3. The arrangement of claim 2, wherein each of said individual cards is notched so that when stacked one upon the other the cards are progressively notched.

4. The arrangement of claim 2, wherein said selection means comprises:
a generally C-shaped member having a first portion depending toward said housing and a second tab portion extending underneath said stacked cards when said cover is in said closed position, said C-shaped member capable of being slid to a position such that said notched portion will lift all cards above a selected card when said cover is in said second position.

5. The arrangement of claim 4, wherein said cover has a top, a spaced-apart button, sides, a back and a front, said cover having a substantially paralellogram configuration.

6. The arrangement of claim 5, wherein one edge of said front terminates in a flange which extends substantially the entire length thereof, said C-shaped member being slidably secured to said cover such that said C-shaped member is guided and supported by said front, said bottom, and said flange.

7. The arrangement of claim 6 wherein said fiber optic means is flexible and sized to permit said C-shaped member to slide along substantially the entire length of said front of said cover.

8. The arrangement of claim 6 wherein said light source is secured between said top and said bottom of said cover.

9. The arrangement of claim 2, wherein said light sensing means is a light sensitive diode.

10. The arrangement of claim 2, wherein each of said identical components has an appropriate letter juxtaposed thereto to aid in selection of the desired card.

* * * * *